United States Patent [19]

Schaefer et al.

[11] 4,363,545

[45] Dec. 14, 1982

[54] PHOTOGRAPHIC PIPELINE INSPECTION APPARATUS INCLUDING AN OPTICAL PORT WIPER

[75] Inventors: Edward F. Schaefer, Tulsa, Okla.; Lawrence R. Lozynski, McHenry; Donald E. Lorenzi, Des Plaines, both of Ill.

[73] Assignee: Magnaflux Corporation, Chicago, Ill.

[21] Appl. No.: 247,766

[22] Filed: Mar. 26, 1981

[51] Int. Cl.³ ...................... G03B 37/00; G01N 29/04
[52] U.S. Cl. .................................... 354/63; 346/33 P; 350/582
[58] Field of Search ................... 354/126, 129, 63, 64, 354/81, 76; 346/33 P, 107 W; 350/61

[56] References Cited

U.S. PATENT DOCUMENTS

| | | | |
|---|---|---|---|
| 2,944,277 | 7/1960 | Ochello et al. | 350/61 X |
| 3,032,766 | 5/1962 | Weaver | 354/81 X |
| 3,667,359 | 6/1972 | Watts et al. | 354/63 |
| 3,810,384 | 5/1974 | Evans | 346/33 P X |

*Primary Examiner*—Donald A. Griffin
*Attorney, Agent, or Firm*—Neuman, Williams, Anderson & Olson

[57] ABSTRACT

This invention relates to apparatus for photographic inspection of the interior of a pipeline and more particularly to apparatus which includes an optical port wiper which makes it possible to obtain clear and accurate photographs under adverse environmental conditions. The apparatus is highly effective and reliable while being comparatively simple and readily and economically manufacturable.

11 Claims, 4 Drawing Figures

U.S. Patent  Dec. 14, 1982  4,363,545
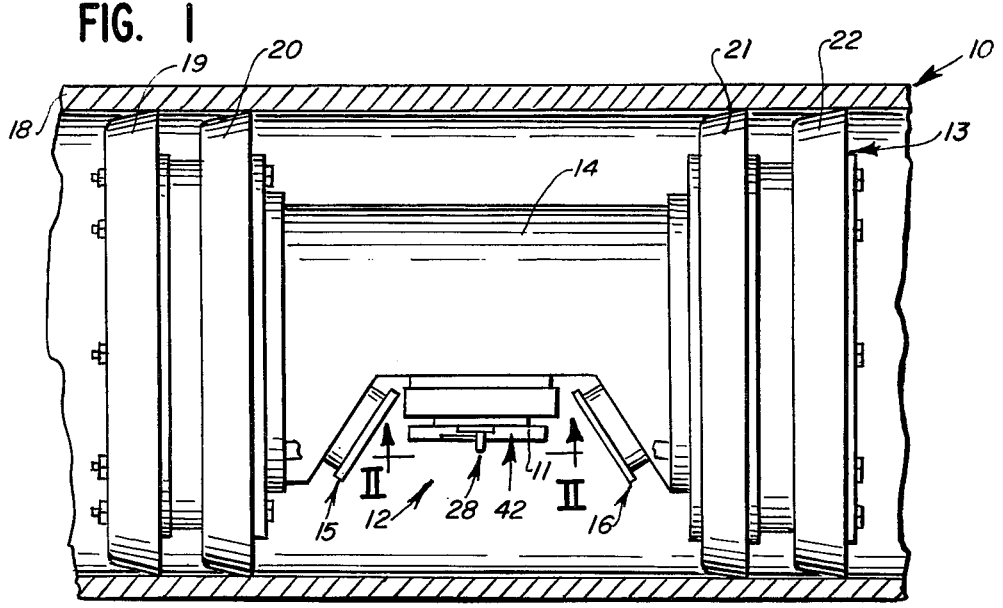
FIG. 1
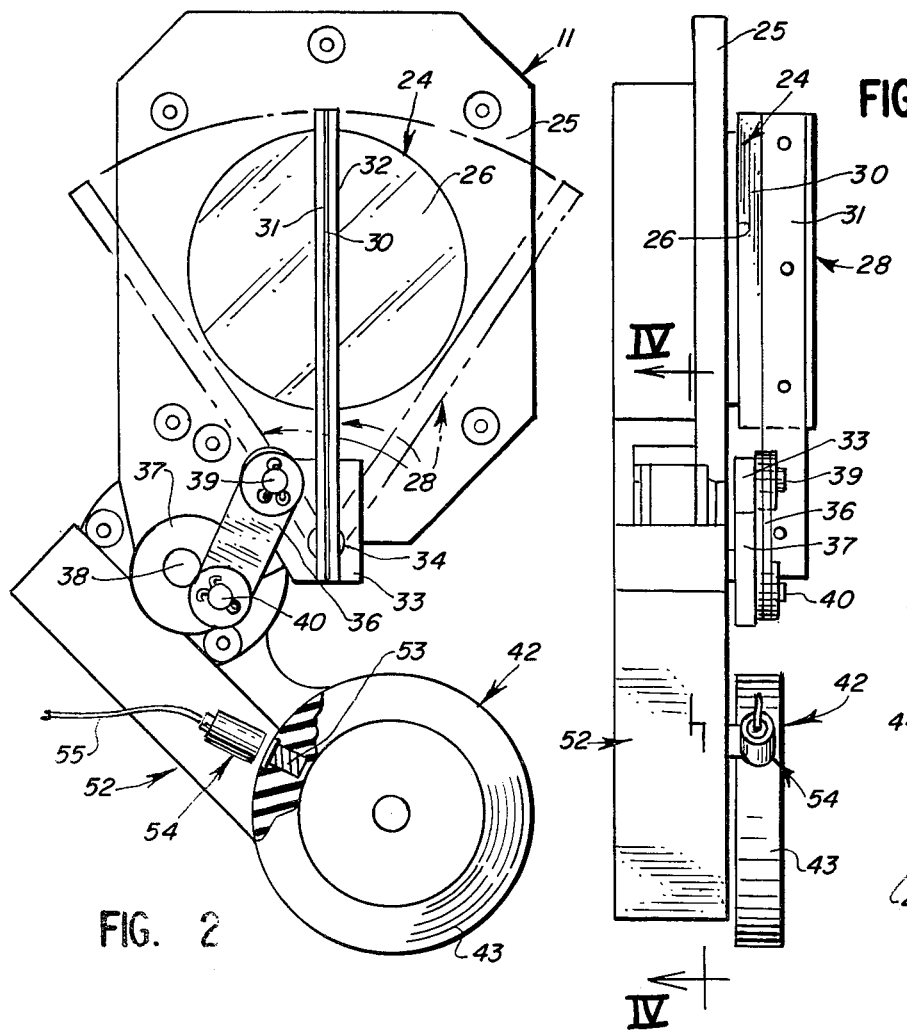
FIG. 2
FIG. 3
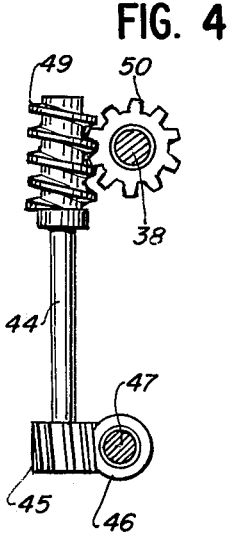
FIG. 4

PHOTOGRAPHIC PIPELINE INSPECTION APPARATUS INCLUDING AN OPTICAL PORT WIPER

BACKGROUND OF THE INVENTION

A photographic apparatus has heretofore been developed for obtaining a record of the internal condition of a pipeline and it has been found to be highly advantageous, especially in connection with the testing of offshore pipelines used for transporting natural gas in its raw state. Natural gas cannot be safely treated offshore and may produce corrosion when transported in its raw state through steel pipe of a pipeline, especially when the temperature is relatively high as is often the case. Natural gas in its raw state may include a combination of carbon dioxide and free water which is operative to produce carbonic acid and which will corrode steel. The effect can be augmented by an erosion effect when the rate of flow is high and at bends and over weld beads or the like where the flow is turbulent.

The effect of such corrosion and erosion as well as other defects can eventually lead to complete failure of the pipe. If such defects can be detected at an early time, it is possible to repair the pipe or otherwise take corrective measures. For example, it is possible to move devices known as "pigs" through a pipe and by moving a series of such pigs through a pipe it can be cleaned, etched, washed, dehydrated and then coated with a protective coating such as an epoxy.

In the apparatus heretofore developed, an image is projected through a film plane from an internal surface area of the pipe along a viewing axis which is normal to the axis of the pipe, a generally rectangular image being used in the film plane which corresponds to a generally rectangular internal surface area of the pipe. With this arrangement, it is possible to obtain a photographic record which can be accurately interpreted and which indicates when repair or maintenance procedures are necessary. Preferably, the camera and associated optical means and illumination means are located within a chamber between forward and rearward cup assemblies in a device which is movable through the pipeline by the pressure of fluid within the pipeline.

Another feature of the apparatus as heretofore developed is in the provision of weight means such that the orientation of the viewing axis may be fixed relative to a vertical position. Normally, it is desirable to place the viewing axis at a "six o'clock" position because it is found that the areas of primary interest are those in the lower side of the pipe where water might accumulate and lead to corrosion and/or erosion of the pipe.

SUMMARY OF THE INVENTION

This invention was evolved with the general object of insuring that photographic records obtained through pipeline inspection apparatus such as heretofore developed are as accurate and reliable as possible. As has been indicated, the detection of corrosion or other defects at an early time can lead to a saving of the very large expense which is involved in shutting down and repair of a pipeline, especially one located under water. At the same time, repair and maintenance procedures may necessitate shutting down of a pipeline for a certain period of time and can otherwise be quite expensive. It is therefore desirable that such procedures be performed only when necessary and it is desirable to make sure that the photographic records obtained are as accurate as possible.

The invention is based in part upon a discovery made during investigation and experimental work that there are conditions within the pipeline which cannot be easily detected from the photographic record obtained but which may cause the photographic record to be inaccurate. One of such conditions is a presence of water or other liquid debris in the pipeline and a presence of solid debris therewithin. Liquid droplets and particles of solid or semisolid debris may adhere to exposed surfaces of the optical means which projects the image from the interior surface of the pipe to the film plane of the camera. Such debris are very difficult to detect from inspection of the photographic record because they are not in sharp focus. They may in some cases cause the recorded image to have the same appearance as that produced by a defect-free, uniformly textured internal pipeline surface. In other cases, they may cause the recorded image to indicate the presence of a defect even though no defect exists.

In accordance with the invention, clearing means are provided for removing debris from the surface of the optical means which is exposed to the ambient environment of the inside of the pipe. Preferably, the clearing means includes a wiper and actuating means for moving the wiper across the exposed surface of the optical means. With this arrangement, increased accuracy and reliability is obtained, there being much less likelihood of an obscuring of the image of the defect as a result of debris on the exposed surface of the optical means. It is also much less likelihood of having an image of a moisture droplet or other debris falsely interpreted as having been produced by a defect on the internal surface of the pipe.

The exposed surface of the optical means may preferably be provided by a surface of a port or window which is of generally planar form so as to facilitate the clearing and wiping action. Another specific feature is that the clearing means may preferably be similar to the windshield wipers of proven reliability used in conventional road vehicles as well as aircraft and boats, using oscillatory motion of a wiper across the exposed surface of the optical means. Thus, the basic construction and operation is relatively simple and a high degree of reliability can be assured.

Another specific feature relates to the provision of drive means which operates in response to longitudinal movement of the device within the pipe to effect oscillatory movement of the wiper. Preferably, a drive wheel is journalled by the device for rotation with its periphery in frictional engagement with the inside surface of the pipe, the drive wheel being journalled about an axis at a plane transverse to the longitudinal axis of the pipe. Means are provided for transforming rotational motion of the drive wheel into oscillatory motion of the wiper across the surface of the optical means. With this arrangement, no electrical energy is required to operate the clearing means. An important advantage is obtained because although batteries may be provided for operation of the illumination means as well as the camera, it is necessary to conserve electrical drain as far as possible in order to operate through long lengths of pipeline.

Additional features relate to the provision of a mechanism for supporting the drive wheel and for transforming its rotational motion into oscillatory motion of the wiper in a manner such that it is highly reliable and efficient while being very durable. A device is so constructed that it is capable of negotiating relatively sharp pipeline bends such as bends having a radius of on the order of three times the diameter of the pipe.

Still another feature relates to the use of the drive wheel for producing electrical impulses for control of the operation of the camera and illumination means, a magnet being preferably carried by the drive wheel.

This invention contemplates other objects, features and advantages which will become more fully apparent from the following detailed description taken in conjunction with the accompanying drawings.

BRIEF DESCRIPTION OF THE DRAWINGS

FIG. 1 is a side elevational view illustrating photographic pipeline inspection apparatus which includes an optical port and a wiper assembly according to the invention, the apparatus being shown as it may be positioned within a pipeline;

FIG. 2 is a bottom plan view of the optical port and the wiper assembly of the apparatus of FIG. 1 looking from a section line as indicated by line II—II in FIG. 1;

FIG. 3 is a side view of the optical port and wiper assembly shown in FIG. 2; and FIG. 4 shows drive transmitting components of the wiper assembly, looking from a section line as indicated by line IV—IV in FIG. 3.

DESCRIPTION OF A PREFERRED EMBODIMENT

Reference numeral 10 generally designates pipeline inspection apparatus which includes a camera mounted above an optical port 11 which is kept clear by a wiper assembly 12 constructed and mounted in accordance with the invention. The illustrated apparatus includes a "pig" device 13 which includes a central housing 14 supporting the optical port 11 and protectively carrying the camera therewithin. The central housing 14 also supports a pair of strobe lights which are mounted behind a pair of illumination posts 15 and 16.

The device 13 is movable longitudinally through a pipeline including a pipe 18 as shown and it includes two forward cups 19 and 20 and two rearward cups 21 and 22 which are respectively disposed in front of and behind the central housing 14. At least one and preferably both of the forward and rearward cup assemblies have weight means associated therewith for establishing an angular orientation of the device 13 such that a viewing axis is established relative to a vertical plane through the pipe axis. The viewing axis is preferably vertical in most applications, so that a photograph is obtained of the lower inside surface of the pipe where flaws are most likely to occur.

The illustrated optical port 11 includes a circular glass window 24 which is held by a retainer plate 25 and which has a surface 26 exposed to the ambient conditions within the pipeline. Droplets or layers of liquid and/or semi-solid or solid particles of debris may adhere to the surface 26 to attenuate, reflect and/or refract light, thereby affecting transmission of light from the illuminated surface of the pipe toward the camera. As a result, the images of actual defects may be obscured or an image may be produced which falsely indicates a defect which does not exist. Such inaccurate results cannot usually be detected from the photograph even when it is very carefully examined and as a result, necessary repair or maintenance procedures may not be made or unnecessary procedures may be instituted.

In accordance with the invention, the wiper assembly 12 is provided for removing materials from the surface 26 for clear transmission of light and to project to the camera an accurate image of the illuminated internal surface portion of the pipe.

The wiper assembly 12 comprises a blade unit 28 which includes a blade 30 of a suitable resilient material, preferably polyurethane. The blade 30 is clamped between a pair of bars 31 and 32 which are carried by a pivotal support member 33 which is disposed on a shaft 34, the shaft 34 being journalled from the retainer plate 25 by a suitable bearing, not shown, and being pivotal about an axis parallel to a central axis of the optical port 11. The pivotal support member 33 is so driven as to oscillate the blade unit 28 between limit positions as indicated by broken lines, the blade unit 28 being shown in a position mid-way between such limit positions.

To oscillate the blade unit 28, the support member 33 is connected through a link 36 to an eccentric drive wheel 37 which is carried by a shaft 38. The shaft 38 is journalled from the retainer plate 25 by suitable bearings, not shown, and is rotatable about an axis parallel to the axis of the shaft 34 which carries the support member 33.

One end of the link 36 is pivotally connected to member 33 by a pin 39 and the other end thereof is pivotally connected to the wheel 37 by a pin 40. The radial distance between the axes of shaft 34 and pin 39 is greater than the radial distance between the axes of shaft 38 and pin 40 so that as the shaft 38 is rotated through 360 degrees, the shaft 34 is oscillated through a certain angle which is on the order of 70 degrees in the illustrated embodiment. It is noted that the wiper unit 28 in its limit positions, indicated in broken lines, moves beyond the glass window 24 of the optical port 11.

The eccentric drive wheel 37 is rotated through a drive connection between the shaft 38 and a wheel 42 which includes a peripheral tire portion 43 of resilient material frictionally engaged with the internal surface of the pipe 18. As diagrammatically shown in FIG. 4, the drive connection includes a shaft 44 which at one end carries a helical gear 45 meshed with a helical gear 46 on a shaft 47 which carries the wheel 42. At its opposite end, the shaft 44 carries a worm 49 meshed with a worm gear 50 on the shaft 38. The arrangement is preferably such that the drive wheel 42 must complete twenty revolutions for the wiper blade unit 28 to complete one cycle, and the diameter of the wheel 42 may be on the order of three inches so that the device travels about sixteen feet during each complete cycle of movement of the wiper blade unit 28.

The shafts 44 and 47 are journalled by suitable bearings, not shown, in a housing 52 which is supported from the retainer plate 25. It is noted that the wheel 42 is approximately in alignment with the wiper blade unit 28, in a plane transverse to the axis of the optical port 11 which in most applications is at a "six o'clock" position for photographing the lower inside surface of the pipe where corrosion and erosion is most likely to occur. The tire portion 43 of the wheel 42, under such circumstances, engages a side portion of the inside surface of the pipe, above lower surface portions which may be wet and slippery from accumulated liquid in the pipe.

It is also noted that the housing 52 may be adjustably rotated relative to the retainer plate, about the axis of the shaft 38, to a position such as to obtain firm engagement between the tire portion 43 and the inside surface of the pipe and suitable spring means may be provided for this purpose, if desired.

In addition to driving the wiper assembly, the wheel 42 is used to develop electrical signals indicating the travel of the device 13 through the pipe 18. In particular, a permanent magnet 53 is carried by the wheel 42 and may preferably be embedded in the resilient tire portion 43 thereof, as shown. A pick-up device 54, which may include a coil on a core of magnetic material, is mounted on the housing 52 in proximity to the periphery of the wheel 42 and functions to develop an electrical pulse during the portion of each revolution of the wheel 42 when the magnet 53 moves past the device 54. The pulses so developed are applied through a cable 55 to electrical circuitry which may be used, for example, to cause operation of the camera at spaced locations within the pipe and in synchronized relation to the oscillatory movement of the wiper blade unit 28.

It will be understood that modifications and variations may be effected without departing from the spirit and scope of the novel concepts of this invention.

We claim:

1. For the inspection of a pipeline, a device arranged to be inserted into a pipe for longitudinal movement therein, said device comprising:
    (1) photographic camera means including
        (a) means defining an image area,
        (b) film storage and transport means arranged for feeding film through said image area, and
        (c) optical means for projecting to said image area an image of a predetermined internal surface area of the pipe, said optical means including a surface exposed to the ambient environment of the inside of the pipe,
    (2) forward and rearward cup means on said device disposed forwardly and rearwardly of said camera means and arranged in general sealing arrangement with the pipe, and
    (3) clearing means for removing solid and liquid debris from said exposed surface of said optical means to facilitate obtaining a clear image of said predetermined internal surface area of the pipe, said clearing means comprising
        (a) a wiper and
        (b) an actuating means for moving the wiper across said exposed surface of said optical means, said actuating means including drive means arranged for transducing said longitudinal movement of said device within said pipe into oscillatory movement of said wiper across said exposed surface of said optical means.

2. In a device as defined in claim 1, said drive means comprising motion converting means responsive to rotational motion for effecting said oscillatory movement of said wiper, a drive wheel journalled from said device and having a periphery frictionally engageable with the inside surface of said pipe to be rotated as said device is moved longitudinally within said pipe, and drive transmitting means for driving said motion converting means from said drive wheel.

3. In a device as defined in claim 2, said exposed surface of said optical means being in a plane generally parallel to the axis of said pipe with said image being projected from said predetermined internal surface area of said pipe along a viewing axis normal to the axis of said pipe and normal to said exposed surface, and said drive wheel and said drive transmitting means being in generally coplanar relation to said exposed surface of said optical means with the axis of said drive wheel being parallel to said viewing axis.

4. In a device as defined in claim 2, said drive transmitting means including a shaft having an axis generally transverse to the axis of rotational motion of said motion converting means and generally transverse to the axis of rotational motion of said drive wheel, first gearing means coupling one end of said shaft to said motion converting means, and second gearing means coupling the other end of said shaft to said drive wheel.

5. In a device as defined in claim 4, one of said gearing means comprising a worm and worm gear assembly.

6. In a device as defined in claim 5, said worm being secured to said one end of said shaft and said worm gear being coupled to said motion converting means.

7. In a device as defined in claim 4, said second gearing means including a pair of helical gears.

8. In a device as defined in claim 1, signal generating means associated with said drive means and arranged for generating electrical pulses at a rate proportional to the velocity of longitudinal movement of said device.

9. In a device as defined in claim 8, said drive means comprising motion converting means responsive to rotational motion for effecting said oscillatory movement of said wiper, a drive wheel journalled from said device and having a periphery frictionally engageable with the inside surface of said pipe to be rotated as said device is moved longitudinally within said pipe, and drive transmitting means for driving said motion converting means from said drive wheel, said signal generating means being operated from rotation of said drive wheel.

10. In a device as defined in claim 9, said signal generating means comprising a magnet carried by said drive wheel, and a field-sensitive pick-up device mounted in proximity to said drive wheel.

11. In a device as defined in claim 1, said oscillatory movement of said wiper including movement of said wiper alternately in opposite directions, said drive means including motion converting means for effecting said movement alternately in opposite directions.

* * * * *